United States Patent [19]
Weishaupt

[11] Patent Number: 4,738,334
[45] Date of Patent: Apr. 19, 1988

[54] SECURITY INSTALLATION FOR MOTOR VEHICLES

[75] Inventor: Walter Weishaupt, Munich, Fed. Rep. of Germany

[73] Assignee: Bayerische Motoren Werke, AG, Munich, Fed. Rep. of Germany

[21] Appl. No.: 918,326

[22] Filed: Oct. 14, 1986

[30] Foreign Application Priority Data

Oct. 11, 1985 [DE] Fed. Rep. of Germany ....... 3536377

[51] Int. Cl.[4] ............................................ B60R 25/04

[52] U.S. Cl. ............................ 180/287; 307/10 AT; 340/64

[58] Field of Search ........................ 180/287; 340/64; 307/10 AT

[56] References Cited

U.S. PATENT DOCUMENTS

| | | | |
|---|---|---|---|
| 4,067,411 | 1/1978 | Conley et al. | 180/287 |
| 4,222,034 | 9/1980 | Orenzow | 180/287 |
| 4,327,353 | 4/1982 | Beard et al. | 340/64 |
| 4,471,343 | 9/1984 | Lewelson | 340/64 |
| 4,580,125 | 4/1986 | Gotonda | 340/64 |

FOREIGN PATENT DOCUMENTS

| | | |
|---|---|---|
| 0098437 | 1/1984 | European Pat. Off. . |
| 2401131 | 1/1974 | Fed. Rep. of Germany . |
| 2324392 | 12/1974 | Fed. Rep. of Germany . |
| 2824421 | 6/1978 | Fed. Rep. of Germany . |
| 2831967 | 7/1978 | Fed. Rep. of Germany . |
| 2838056 | 8/1978 | Fed. Rep. of Germany . |
| 2844421 | 10/1978 | Fed. Rep. of Germany . |
| 2926304 | 6/1979 | Fed. Rep. of Germany . |
| 3103026 | 1/1981 | Fed. Rep. of Germany . |
| 3300170 | 1/1983 | Fed. Rep. of Germany . |
| 3313098 | 4/1983 | Fed. Rep. of Germany . |
| 8432429 | 11/1984 | Fed. Rep. of Germany . |

*Primary Examiner*—John J. Love
*Assistant Examiner*—Ross Weaver
*Attorney, Agent, or Firm*—Barnes & Thornburg

[57] ABSTRACT

In a security installation for motor vehicles with a stationary transponder installed at the motor vehicle for producing a coded interrogating signal, with a portable transponder for receiving the coded interrogating signal and for transmitting a coded response signal and with a coded signal comparator which in case of matching of the coded response signal with an expected coded signal produces an unlocking signal, the switching signal is produced with the aid of a manually actuatable switch arranged at the motor vehicle which is connected with an actuating member provided already for the use of the motor vehicle.

8 Claims, 1 Drawing Sheet

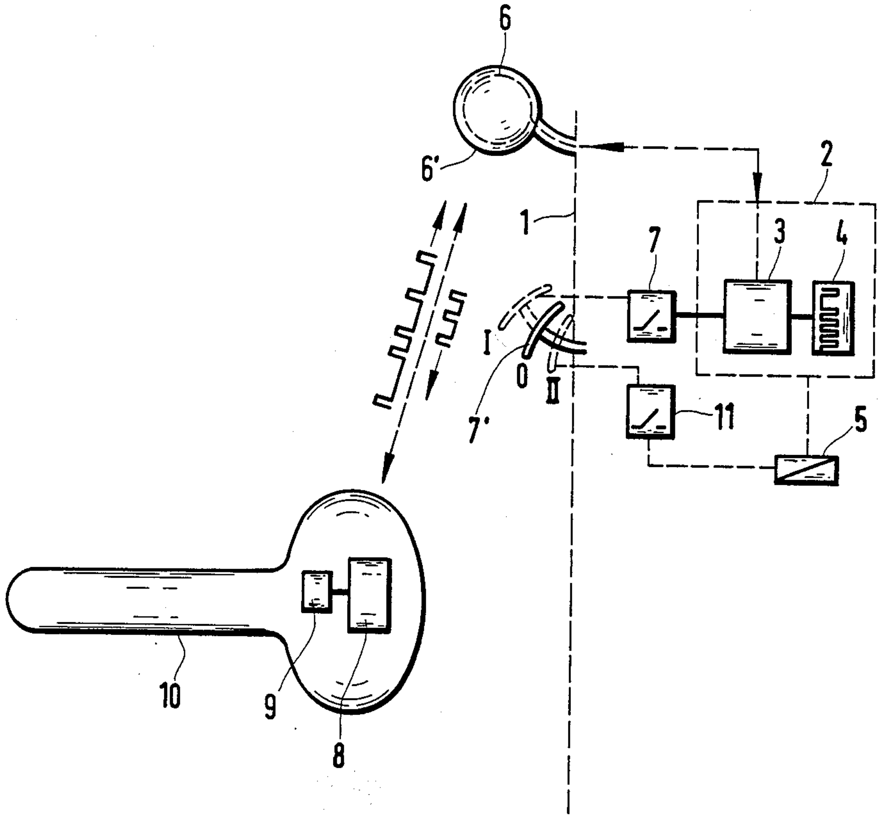
6
6'
1
2
3
4
7
I
0
II
7'
11
5
10
9
8

SECURITY INSTALLATION FOR MOTOR VEHICLES

The present invention relates to a security installation for motor vehicles, with a stationary transponder installed at the motor vehicle for producing a coded interrogating signal on the basis of a switching signal and with a portable transponder for receiving the coded interrogating signal and for transmitting a coded response signal, and with a coded signal comparator which in case of agreement of the coded response signal with an expected coded signal produces an unlocking signal in an unlocking system.

Such a security installation is disclosed in the German Patent No. 33 13 098. The switching signal is produced with the aid of the portable transponder. The term "transponder" is to be understood hereinafter as a transmitting-receiving-device. The portable transponder produces the switching signal in that it emits initially a coded opening signal at the stationary transponder. This signal is compared with a stored coded signal and in case of agreement of the two coded signals, the switching signal is produced. This security installation thus requires prior to the transmission, respectively, reception of the coded interrogating signal an actuation of the stationary transponder to be carried out manually. This, in turn, presupposes again that the coded opening signal is transmitted interference-free to the stationary transponder. Additionally, a further operation is necessary prior to the manual opening of the motor vehicle, properly speaking.

The present invention is concerned with the task to provide a security installation of the aforementioned type which without preparatory operation enables directly an opening of the motor vehicle by the authorized user.

The underlying problems are solved according to the present invention by a manually actuatable switch arranged at the motor vehicle for the initiation of the switching signal, which switch is connected with a manually operated actuating device provided for the use of the motor vehicle.

With the actuation of the manually operated actuating device, the coded interrogating signal is emitted. The portable transponder taken along by the user transmits immediately thereafter the coded response signal while the actuating device is still in its opening position. If the coded response signal matches with the expected coded signal, then the unlocking signal is produced and the motor vehicle can then be opened.

The coded interrogating and response signal can thereby be produced preferably on an HF-basis. A small transmission power thereby suffices for both transponders because the vehicle user, during actuation of the actuating device, is in direct proximity of the motor vehicle. Interference problems as a result of excessively large transmission distances between the two transponders can be avoided thereby.

The actuating device thereby involves preferably a door-actuating part or a lid or hood-actuating part, preferably a door handle or a push-button used for the opening of a hood or lid. The switching signal may be provided only by a single manually operable actuating part, for example, by the door handle of the driver door, or at several places, for example, by this door handle and by the actuating device for the opening of the rear (trunk) lid.

The transmitting energy for the portable transmitter can be made available in different ways. A simple possibility therefor is provided by a battery connected with the transponder. A further possibility resides in radiating a corresponding power from the stationary transponder. An example therefore is disclosed in the DE-OS No. 30 29 567 within the frame of a transmitting method for the value of the tire pressure of a motor vehicle.

In addition to the unlocking signal, a locking signal can also be produced with the aid of the manually operated actuating device in a corresponding manner. For that purpose, provision is made, for example, to cause the actuating device by actuation in the opposite direction to initiate a corresponding locking signal either directly with the aid of a switch arranged in the actuating device or indirectly. In the latter case, a further switch may be connected with the actuating device, during the actuation of which the stationary transponder transmits a corresponding coded interrogating signal to the portable transponder and upon receipt of a corresponding coded response signal then supplied by the portable transponder, produces the locking signal.

These and other objects, features and advantages of the present invention will become more apparent from the following description when taken in conjunction with the accompanying drawing which shows, for purposes of illustration only, one embodiment in accordance with the present invention, and wherein:

The single FIGURE is a schematic view of a safety installation for motor vehicles in accordance with the present invention.

Referring now to the single FIGURE of the drawing, a schematically illustrated motor vehicle 1 includes a stationary transponder 2, in the output of which is connected a coded signal comparator 3. The coded signal comparator 3 is further connected with a coded signal memory 4 and controls a schematically indicated locking and unlocking device 5 of the motor vehicle. The last-mentioned device 5 may involve, for example, an electromagnet for the actuation of a locking latch in a door lock (not shown) of a motor vehicle door, for example, of the driver door, or of several such latches in all of the doors and hoods and lids of the motor vehicle which are connected with each other by way of a central locking system.

The stationary transponder 2 includes an antenna 6 which is accommodated, for example, in an outside mirror 6' of the motor vehicle. A switch 7 is further coordinated to the transponder 2 which is actuatable manually with the aid of a manually operated member 7' of the motor vehicle, for example, of a door handle, when the latter is displaced from its normal rest position 0 into its operating position I for the opening of the motor vehicle. The transponder 2 further cooperates with a portable transponder 8 which is carried by a vehicle user, for example, in the housing of an ignition key 10. The transponder 8 also includes a transmitting and receiving device, not illustrated in detail, for example, also in the form of an antenna as well as a chargeable energy storage device 9 for readying a corresponding transmission output.

For utilizing the motor vehicle, the vehicle user actuates the manually operable actuating member 7'. The transponder 2 is thereby activated by the switch 7 which is actuated thereby, and transmits a coded interrogating signal by way of the antenna 6. This coded interrogating signal reaches the transponder 8 which is located in direct proximity of the motor vehicle. This coded interrogating signal produced on HF-basis, supplies at the same time the energy to the transponder 9 or is accompanied by a non-coded energy-rich signal which is also emitted by the antenna 6 and charges the energy storage device 9 of the transponder 8. The transponder 8 produces a coded response signal individual to the respective vehicle user and transmits the same to the transponder 2 which receives the same also by means of the antenna 6 and supplies the same to the coded signal comparator 3. The latter compares the coded response signal with an expected coded signal contained in the coded signal memory 4 and upon matching of the two coded signals produces an unlocking signal to the locking installation 5.

A non-authorized vehicle user, by contrast, cannot receive the coded interrogating signal of the transponder 2 or cannot produce the "matching" coded response signal. The coded signal comparator 3 thereby determines the missing correspondence of the two coded signals and does not produce an unlocking signal to the locking installation 5.

Additionally, also a locking signal for the motor vehicle may also be produced with the aid of the manually operable actuating member 7'. For that purpose, the member 7' includes a second operating position II which is assumed with an opposite movement of the member 7'. The member 7' thereby actuates a further switch 11 which engages the locking device 5. The latter thereby locks the motor vehicle in that it displaces a latching member into its locking position.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A security installation for motor vehicles, comprising stationary transponder means installed at the motor vehicle for producing a coded interrogating signal, a portable transponder means for receiving the coded interrogating signal and for transmitting a coded response signal, comparator means in the motor vehicle which upon matching of the coded response signal with an expected coded signal produces an unlocking signal to an unlocking means, and manually actuatable switch means arranged at the motor vehicle for initiating a switching signal for causing said stationary transponder means to produce said coded interrogatory signal, said manually actuatable switch means being connected with a manually operable actuating means provided for the use of the motor vehicle.

2. A security installation according to claim 1, wherein the actuating means is part of at least one of a door actuating device, and a hood actuating device and a lid-actuating device.

3. A security installation according to claim 2, wherein the actuating means is a door handle of the motor vehicle.

4. A security installation according to claim 1, wherein by movement in the opposite direction the actuating means is also operable to initiate a locking operation of the motor vehicle with the aid of a further switch means actuated thereby.

5. A security installation according to claim 4, wherein the production of the switching signal for the locking operation takes place by transmission, respectively, reception of a corresponding coded interrogating and response signal with the aid of the two transponder means, the corresponding coded signals for the locking operation being changed at least partly with respect to the coded signal used for unlocking the motor vehicle.

6. A security installation according to claim 4, wherein the actuating means is a part of a door- or hood- or lid-actuating device.

7. A security installation according to claim 6, wherein the actuating means is a door handle of the motor vehicle.

8. A security installation according to claim 6, wherein the production of the switching signal for the locking operation takes place by transmission, respectively, reception of a corresponding coded interrogating and response signal with the aid of the two transponder means the corresponding coded signals for the locking operation being changed at least partly with respect to the coded signal used for unlocking the motor vehicle.

* * * * *